United States Patent
Moore

(10) Patent No.: US 7,398,181 B2
(45) Date of Patent: Jul. 8, 2008

(54) METHOD FOR RETRIEVING RELIABILITY DATA IN A SYSTEM

(75) Inventor: David A. Moore, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 10/858,743

(22) Filed: Jun. 2, 2004

(65) Prior Publication Data

US 2005/0273642 A1 Dec. 8, 2005

(51) Int. Cl.
*G06F 11/00* (2006.01)

(52) U.S. Cl. ............... 702/182; 702/183; 702/186; 714/724; 714/1; 324/158.1; 324/757

(58) Field of Classification Search ............ 702/182, 702/183, 186; 714/724, 725, 733, 1; 324/158.1, 324/757
See application file for complete search history.

(56) References Cited

U.S. PATENT DOCUMENTS

| | | | | |
|---|---|---|---|---|
| 5,968,192 A | * | 10/1999 | Kornachuk et al. | 714/724 |
| 6,219,628 B1 | * | 4/2001 | Kodosky et al. | 703/2 |
| 6,351,134 B2 | * | 2/2002 | Leas et al. | 324/765 |
| 6,684,349 B2 | * | 1/2004 | Gullo et al. | 714/47 |
| 6,701,270 B1 | | 3/2004 | Miller et al. | |
| 6,742,069 B2 | * | 5/2004 | Papa et al. | 710/302 |
| 7,058,826 B2 | * | 6/2006 | Fung | 713/300 |

* cited by examiner

*Primary Examiner*—Jjohn E Barlow, Jr.
*Assistant Examiner*—Hien X Vo

(57) ABSTRACT

An aspect of the present invention is a method for retrieving reliability data in a system. The method includes coupling a device to the system, collecting the reliability data with the device and retrieving the reliability data from the device.

22 Claims, 8 Drawing Sheets

METHOD FOR RETRIEVING RELIABILITY DATA IN A SYSTEM

FIELD OF THE INVENTION

The present invention relates generally to system reliability prediction and particularly to a method for retrieving reliability data in a system.

BACKGROUND OF THE INVENTION

Reliability assessment and prediction of failure rates of electrical and mechanical parts is a valuable tool used by a wide array of industries, such as, manufacturers and distributors of automobiles, high-end electrical equipment, household and industrial mechanical equipment, military contract goods, space industry equipment, and aircraft and avionics systems. Reliability predictions are often used to assist management in deciding appropriate maintenance schedules, replacement parts needs for immediate use, end-item estimated lifetime, end-item projected costs, and safety analyses.

With regard to products related to Information Technology, such as computer parts/products, reliability prediction data is typically obtained by taking a large sample of the finished product and conducting a long term trial. When a significant fraction of the product has failed, a prediction of the performance of the rest of the test group can be constructed and applied to the general population of the product. This is not a practical approach since the test duration is often longer than the shipping lifetime of the product thereby resulting in a prediction that is determined after the product is no longer being sold.

Accordingly, what is needed is a more practical approach to collecting reliability prediction data from the associated equipment. The approach should be simple, inexpensive and capable of being easily adapted to existing technology. The present invention addresses these needs.

SUMMARY OF THE INVENTION

An aspect of the present invention is a method for retrieving reliability data in a system. The method includes coupling a device to the system, collecting the reliability data with the device and retrieving the reliability data from the device.

Other aspects and advantages of the present invention will become apparent from the following detailed description, taken in conjunction with the accompanying drawings, illustrating by way of example the principles of the invention.

DETAILED DESCRIPTION

The present invention relates to a method for retrieving reliability data in a system. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

In accordance with varying embodiments, a device resides on a subassembly of an electronic system. The device is capable of counting the total time that the associated subassembly is active (time on) and the number of times the subassembly has been activated (cycle count). The device is capable of storing this information in a non-volatile Electrically Eraseable Programmable Read Only Memory (EEPROM). The total hours and cycle count information may be read from the device using a serial protocol. For example, the System Management Bus (SMB) serial protocol could be implemented.

By installing this device on various subassemblies within an electronic system (for example, a computer) it is possible to track the time on and cycle count for each associated subassembly. This data could be beneficial for a customer that needs to track the age and usage profile of each subassembly. This is especially helpful if the subassembly is a hot-pluggable unit. When a unit is hot-pluggable, the unit can be re-deployed many times in different systems. By utilizing a device that resides on the subassembly, the record of device time on and cycle count remains with the subassembly regardless of how many times the subassembly is re-deployed.

The installation of this device enables the deployment of tracking software that makes "on time" and cycle count information available to data center managers and the like. Alternatively, this information could be recovered at a service facility or during a site visit and logged as part of the service event, even if the subassembly is inoperable. This field data is useful in estimating/improving reliability and availability parameters. The accuracy of these parameters are imperative because these parameters have a direct impact on customer relations and sales.

Figure 1:
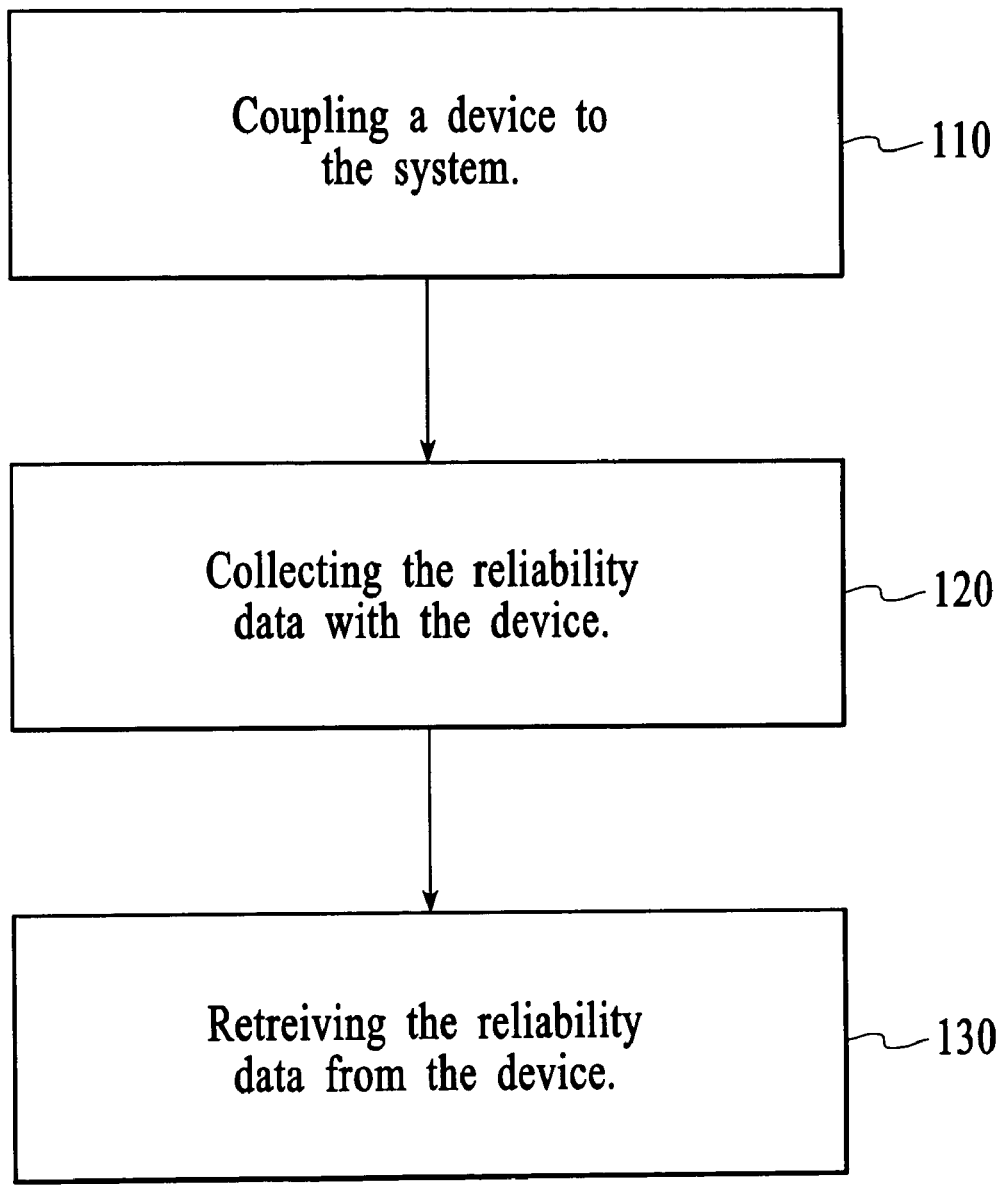
FIG. 1 is a flowchart of a method for retrieving reliability data in a system in accordance with an embodiment of present invention.

FIG. 1 is a flow chart of a method for monitoring reliability data in a system. A first step 110 includes coupling a device to the system. A second step 120 includes collecting the reliability data with a device coupled to the system. A final step 130 includes retrieving the reliability data from the device. Again, the accuracy of this data is imperative because this data has a direct impact on customer relations and sales.

Figure 2:
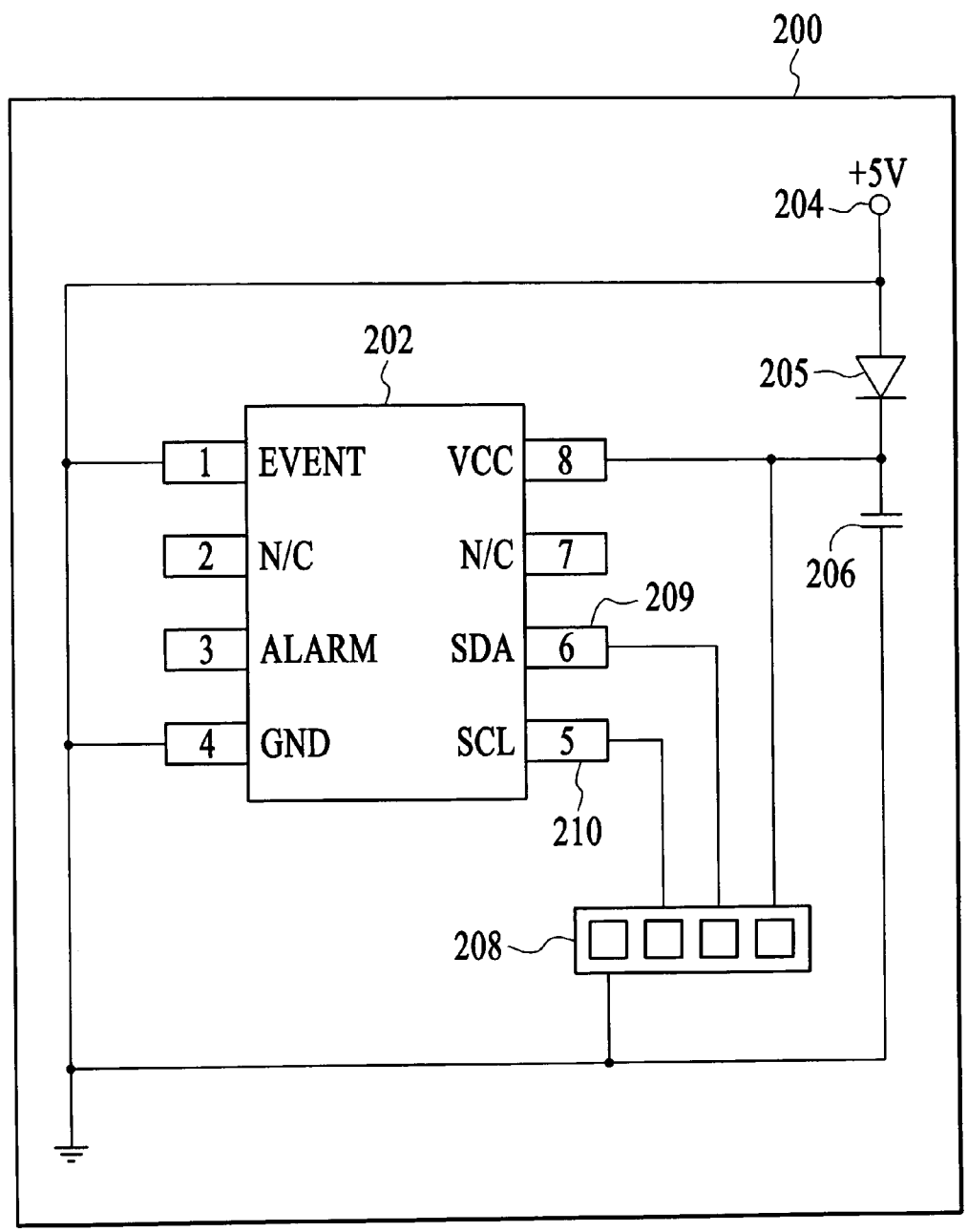
FIG. 2 shows a first configuration of a device for collecting reliability data in accordance with an embodiment of the present invention.

FIG. 2 is a device configuration 200 for monitoring a system in accordance with an embodiment. The configuration 200 includes a counter 202 coupled to a power supply 204 of the subassembly to be monitored. In an embodiment, the counter 202 is a Maxim/Dallas Semiconductor DS1682 hardware device. Also shown is a large capacitor 206 (approximately 33 microFarads) coupled to the counter 202 for providing temporary power to the counter 202 after the power supply 204 is shut down. This provides the counter 202 enough time to complete a write to the internal memory upon system power down.

A diode 205 prevents the capacitor 206 from supplying voltage to other components on the system board. This enables more stored charge for the counter 202. A jumper 208 allows for an external connection to the System Management Bus (SMB) interface of the counter 202 wherein the SMB interface includes a data connection 209 and a clock connection 210. The jumper 208 provides connections for the SMB signals as well as power and ground.

Additionally, the jumper 208 allows the counter 202 to be powered without activating the power supply 204. This allows the counter 202 to be read from an external diagnostic tool even if the monitored subassembly is not installed in a system. In this implementation, the tool is configured to read the total hours and the event count from the counter 202. The tool could be implemented via a Personal Digital Assistant (PDA), a notebook computer, or the like that contains an SMB controller and a module for reading the signals from the counter 202.

Although the collection of time on and cycle count information has been discussed, one of ordinary skill in the art will readily recognize that other data collection and storage implementations are possible while remaining within the spirit and scope of the present invention. For example, the EEPROM could be utilized to store subassembly serial number data or other information related to the history of the subassembly. Alternatively, an additional EEPROM could be added for more memory. This would allow additional history information to be maintained and communicated.

The above-described configuration 200 can be used to monitor a variety of subassembly types including, but not limited to, the following:

Hot pluggable hard drive assemblies—Hard drives are the storage medium in desktop and laptop computers as well as all servers and mainframes throughout the world. They are also used in printers for storing fonts and print jobs as well as MP3 players and a myriad of other portable and stationary computer-based devices. Although removable disks encased in cartridges use the same "hard" disk media and a similar drive technology, they are mostly called "removable drives" rather than hard drives.

Hot pluggable power supplies—A power supply is an electrical system that converts AC current from the wall outlet into the DC currents required by the computer circuitry. A computer power supply typically generates multiple voltages. For example, 12 volts is used for drives, and either 3.3 or 5 volts is used for the electronic circuitry.

System boards—A system board is a printed circuit board that contains the primary central processing unit.

Blade modules—A blade module is a small pluggable chassis implementing a self contained computer system. These modules are often not much larger than expansion cards used in first generation PCs such as the IBM AT. An example blade module produced by Hewlett-Packard is approximately 5" tall×12" long×0.75" thick. This blade implements a full server computer with a processor, hard drive, memory, network interface, etc. This allows for very dense packaging of server systems and is easily serviceable since the individual units just slide out without disconnecting any cables.

Hot-pluggable fan assemblies—These are utilized to circulate air in a computer or other electronic system.

Backplanes—A backplane is an interconnecting device that may or may not have intelligence, but typically has sockets that cards (boards) plug into. Although resistors may be used, a passive backplane adds no processing in the circuit. An intelligent backplane, or active backplane, may have microprocessor or controller-driven circuitry that adds a little or a lot of processing.

Expansion boards—An expansion board is a printed circuit board that plugs into an expansion slot and extends the computer's capability to control a peripheral device. All the boards (cards) that plug into a computer's bus are expansion boards, such as display adapters, disk controllers, network adapters and sound cards.

Processor module—A processor module is a small PCB that contains the processor and several associated components. An example is the Intel Pentium II and Pentium III architectures where the processor chip is supplied on a PCB with cache controllers and cache memory. This processor chip was not available without this additional circuitry.

Memory—The computer's workspace (physically, a collection of RAM chips). The memory determines the size and number of programs that can be run at the same time, as well as the amount of data that can be processed instantly.

Print/Toner cartridges—A cartridge containing an electrically charged ink used in copy machines and laser printers. The ink adheres to an invisible image that has been charged with the opposite polarity onto a plate or drum or onto the paper itself.

Projector lamps—A projector lamp is the light source in PC projector displays. The lamps run extremely hot, and tend to have a fairly short life. The lamps are also very expensive.

Although the above-described subassemblies are disclosed, one of ordinary skill the art will readily recognize that a variety of different subassemblies could be utilized in conjunction with the described mechanism while remaining within the spirit and scope of the present invention.

Figure 3:
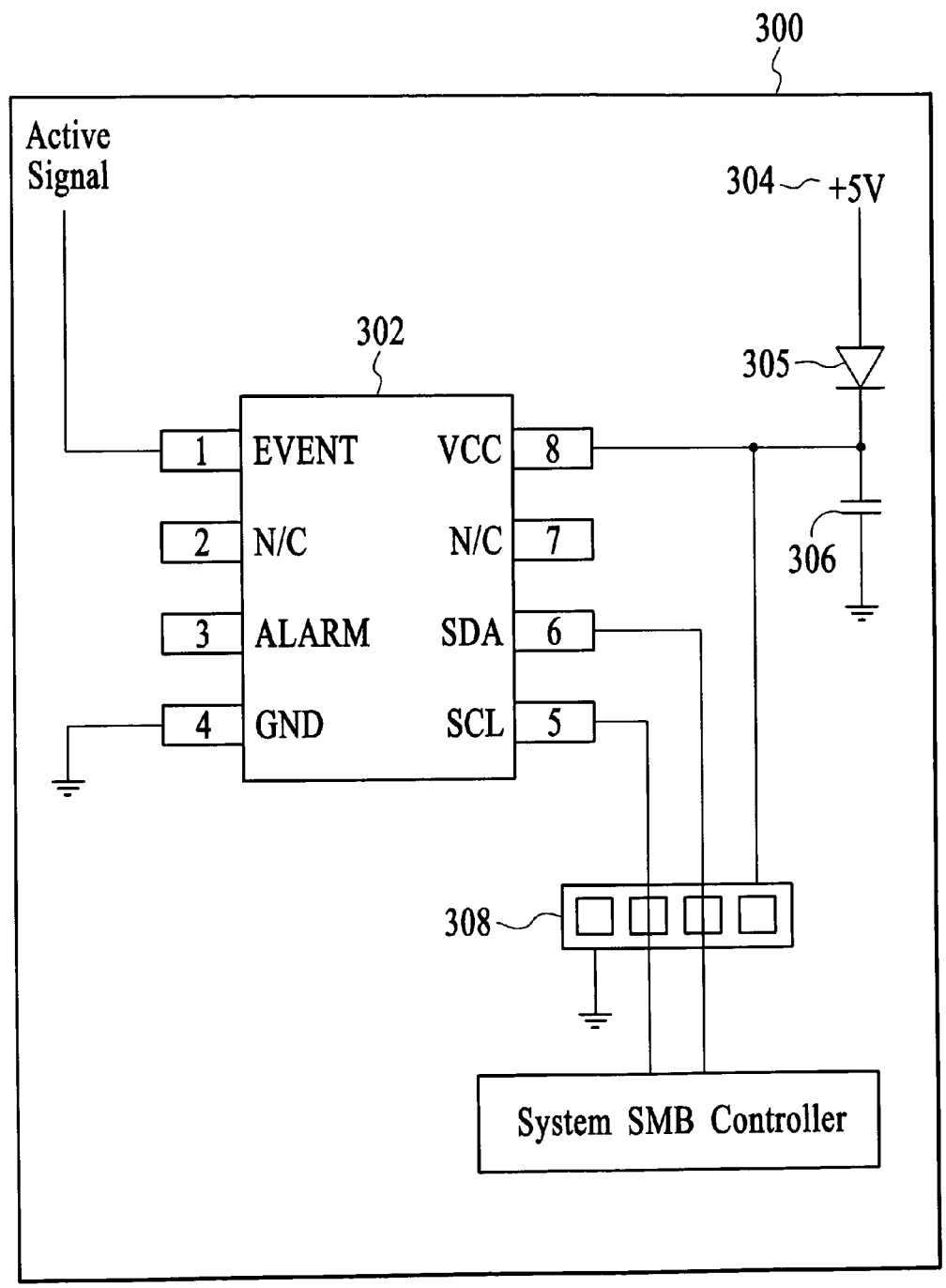
FIG. 3 shows an example of a second configuration of a device for collecting reliability data in accordance with an embodiment of the present invention.

An alternate embodiment employs the configuration 200 of FIG. 2 in conjunction with a connection to the SMB of the monitored subassembly. FIG. 3 shows an example of a second configuration 300 of the device. This configuration can be referred to as the "connectable" configuration.

Similar to configuration 200, the connectable configuration 300 includes a counter 302 coupled to the power supply 304 of the subassembly to be monitored. Also included is a diode 305, a large capacitor 306 and a jumper 308 provides connections for the SMB signals as well as power and ground. In this embodiment, the jumper 308 is coupled to a controller 310 wherein the controller 310 provides a connection to the SMB of the monitored subassembly. Consequently, the configuration 300 allows the monitored subassembly to read from and write to the counter 302.

Accordingly, the monitored subassembly can access the total hours of operation and the cycle count information stored in the counter 302 via a subassembly management application. Furthermore, status information of the monitored subassembly can be written to the EEPROM. Additionally, with this implementation, the monitored event is not necessarily the power supply of the subassembly. Depending on the signal connected to the counter 302, events such as disk drive activity, tape drive usage hours or other information can also be monitored.

It is also possible to manage redundant systems using time on information from the counter 302. For instance, some systems use redundant fans to provide cooling for a critical portion of the system. In these systems, fans can be turned on utilizing control logic whereby fans are accessed based on the time on information recorded with the counter 302. This allows the amount of operating time to be balanced amongst the fans thereby ensuring equal wear. Alternatively, the logic can be configured to operate an older fan until failure and then operate the next oldest fan as the backup. These decisions can be made accurately even if a "used" fan from another system is installed because the usage data (i.e. the counter) resides on the fan module itself.

Figure 4:
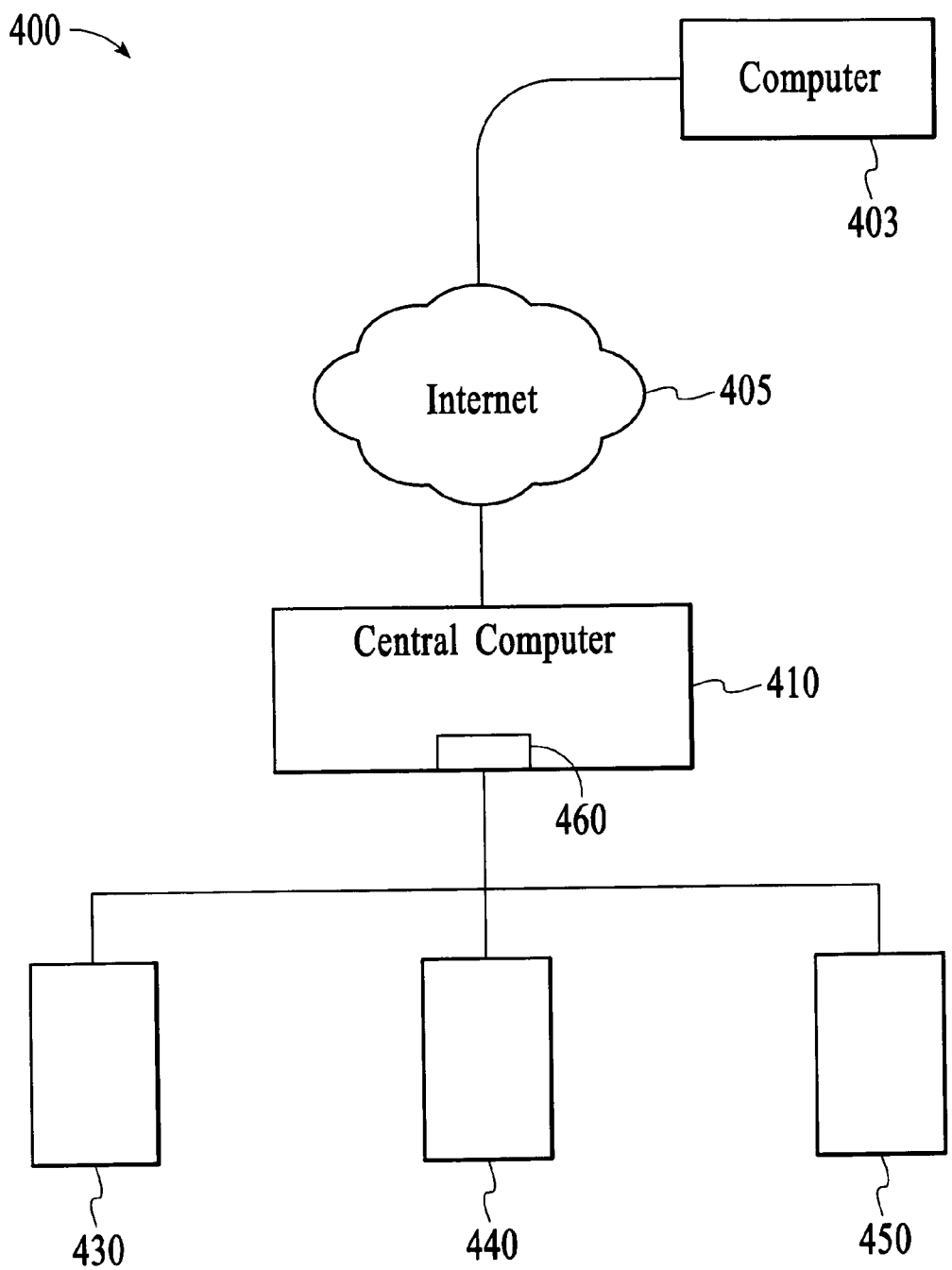
FIG. 4 shows a data collection network in accordance with an embodiment of the present invention.

Through the utilization of the connectable configuration 400, a data collection network is contemplated. FIG. 4 shows a data collection network 400 in accordance with an embodiment. The data collection network 400 includes a central computer system 410 coupled to a plurality of subsystems 430, 440, 450 wherein each of the plurality of subsystems 430, 440, 450 includes one or more subassemblies.

Figure 5:
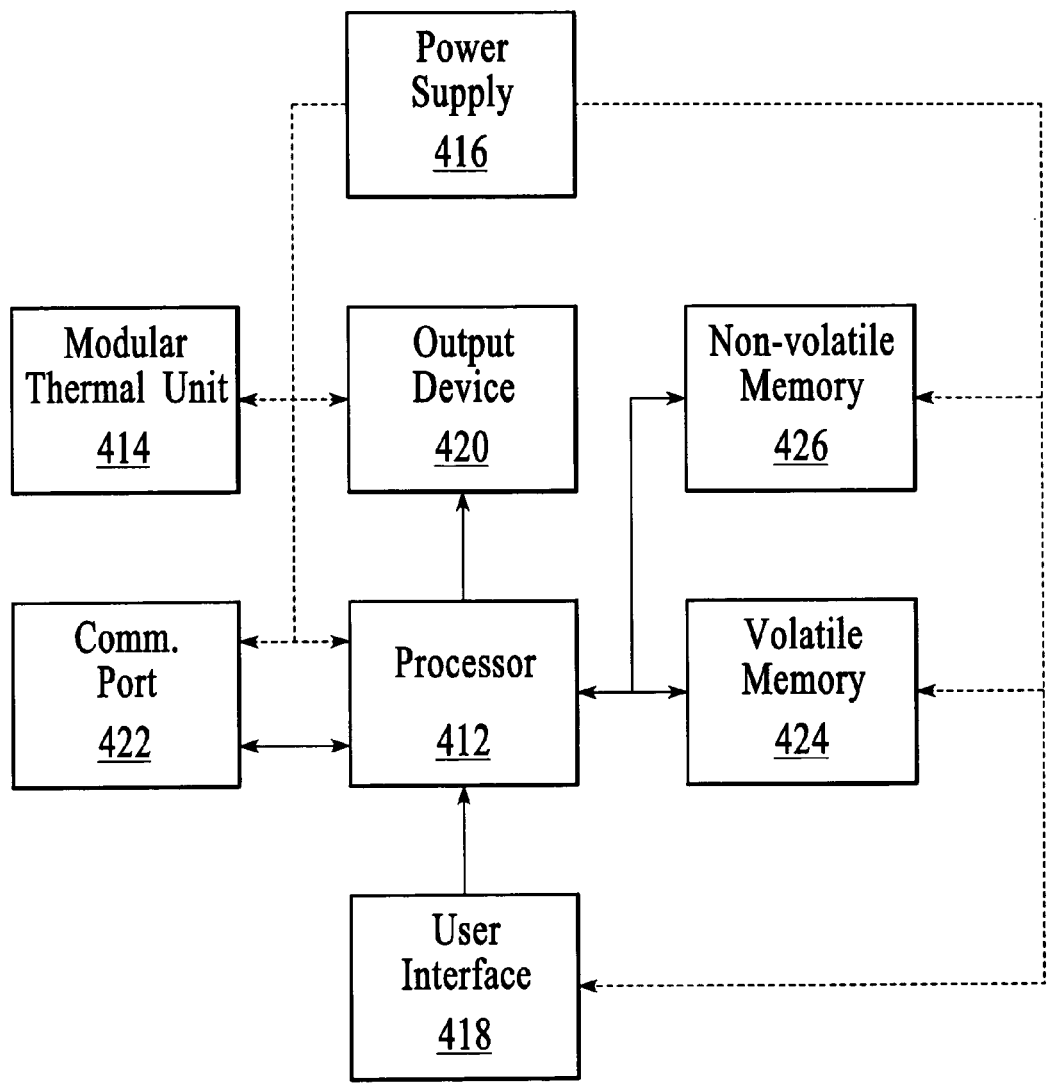
FIG. 5 shows an example of a central computer system that could be implemented in conjunction with an embodiment of the present invention.

For an example of a central computer system, please refer to FIG. 5. In FIG. 5, a block diagram of a computer system 410 is featured. Computer 410 may be any of a variety of different types, such as a notebook computer, a desktop computer, an industrial personal computer, an embedded computer, etc. In the illustrated embodiment, a processor 412 controls the functions of computer system 410. In this embodiment, data, as illustrated by the solid line, is transferred between the processor 412 and the components of system 410. Additionally, a modular thermal unit 414 is used to remove heat from the processor 412. Computer 410 also includes a power supply 416 to supply electrical power, as illustrated by the dashed line, to the components of computer system 410.

Computer system 410 may incorporate various other components depending upon the desired functions of computer 410. In the illustrated embodiment, a user interface 418 is coupled to processor 412. Examples of a user interface 418 include a keyboard, a mouse, and/or a voice recognition system. Additionally, an output device 420 is coupled to processor 412 to provide a user with visual information. Examples of an output device 420 include a computer monitor, a television screen, a printer or the like. In this embodiment a communications port 422 is coupled to processor 412 to enable the computer system 410 to communicate with an external device or system, such as a printer, another computer, or a network.

Processor 412 utilizes software programs to control the operation of computer 410. Electronic memory is coupled to processor 412 to store and facilitate execution of the programs. In the illustrated embodiment, processor 412 is coupled to a volatile memory 424 and non-volatile memory 426. A variety of memory types, such as DRAMs, SDRAMs, SRAMs, etc., may be utilized as volatile memory 424. Non-volatile memory 426 may include a hard drive, an optical storage, or another type of disk or tape drive memory. Non-volatile memory 426 may include a read only memory (ROM), such as an EPROM, to be used in conjunction with volatile memory 424.

Figure 6:
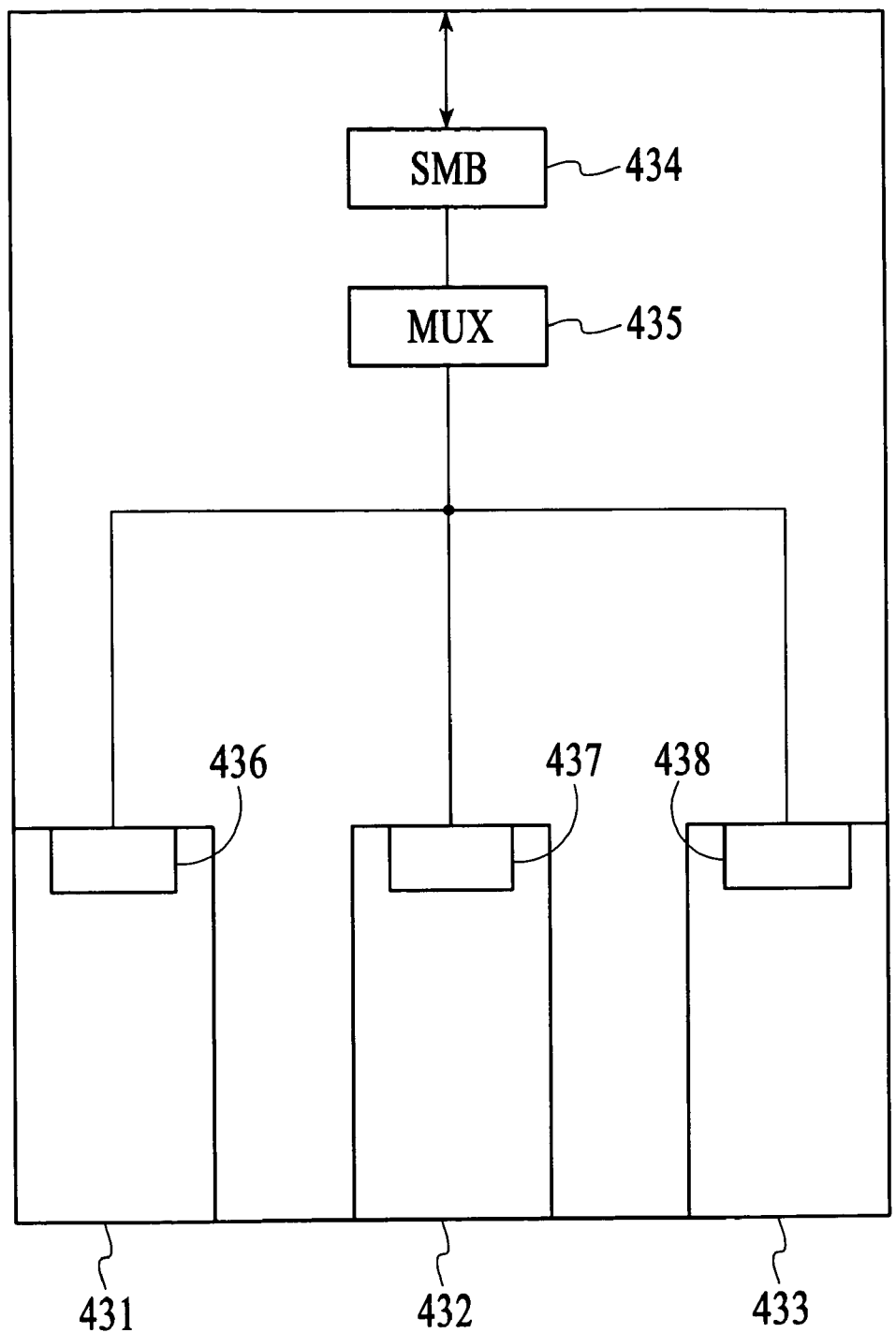
FIG. 6 shows a more detailed illustration of a subsystem in accordance with an embodiment of the present invention.

FIG. 6 shows a more detailed illustration of subsystem 430. It should be understood that subsystems 440 and 450 include components similar to those of subsystem 430. In an embodiment, the subsystem 430 is a stand-alone computer or the like. The subsystem 430 includes a plurality of subassemblies 431, 432, 433 wherein each subassembly includes a respective counter 436, 437, 438. The subassemblies 431, 432, 434 can be any one of the variety of above-disclosed subassemblies (hard-drive, expansion board, backplane, etc.). Each counter 436, 437, 438 comports with the "connectable" configuration (see FIG. 3) and tracks the time on and cycle count information for the respective subassembly. Each counter 436, 437, 438 is connected to the System Management Bus (SMB) 434 via a multiplexer 435. (Multiplexing makes it possible to install multiple counters on the same SMB.)

Referring back to FIG. 4, the SMB 434 is connected to a subassembly management module 460 within the central computer system 410. Accordingly, the subassembly management module 460 can collect the time on and cycle count information from each of the subassemblies in each of the subsystems 431, 432, 433 via an Ethernet connection to the subsystems 431, 432, 433.

The system 410 may also be utilized in conjunction with a distributed computing environment where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet. Additionally, the networks could communicate via wireless means or any of a variety of communication means while remaining within the spirit and scope of the present invention. The Internet is an example of an exemplary distributed computing environment.

The Internet, which is a global web of interconnected computers and computer networks, integrates local area networks (LANs) located in various entities, such as businesses, libraries, federal agencies, institutes of learning, and research organizations into a single communication network. The Internet uses a common communication protocol suite, known as a Transmission Control Protocol/Internet Protocol, which was specifically designed for the interconnection of different computer systems. Internal and external networks are linked by routers that route data packets from a sending network to another router or a receiving network. Gateways handle data transfer and conversion of messages from a sending network to the protocols used by a receiving network. Typically, gateways translate messages from one vendor's messaging program to another vendor's messaging program so that users with different e-mail programs can share messages over a network. FIG. 4 shows the central computer system 410 connected to the Internet 405. Accordingly the subassembly management module 460 can be accessed by a remote computer 403 via the Internet 405.

Another contemplated embodiment is the implementation of the subassembly management module 460. With this embodiment the subassembly management module 460 operates a computer system to execute a sequence of machine-readable instructions. The instructions may reside in various types of computer readable media. In this respect, this embodiment concerns a programmed product, including computer readable media tangibly embodying a program of machine-readable instructions executable by a digital data processor.

This computer readable media may comprise, for example, RAM contained within the system. Alternatively, the instructions may be contained in another computer readable media and directly or indirectly accessed by the computer system. Whether contained in the computer system or elsewhere, the instructions may be stored on a variety of machine readable storage media, such as a Direct Access Storage Device (DASD) (e.g., a conventional "hard drive" or a RAID array), magnetic data storage diskette, magnetic tape, electronic non-volatile memory, an optical storage device (for example, CD ROM, WORM, DVD), or other suitable computer readable media including transmission media such as digital, analog, and wireless communication links. The machine-readable instructions may include lines of compiled C, C++, java, or similar language code commonly used by those skilled in the programming for this type of application arts.

Figure 7:
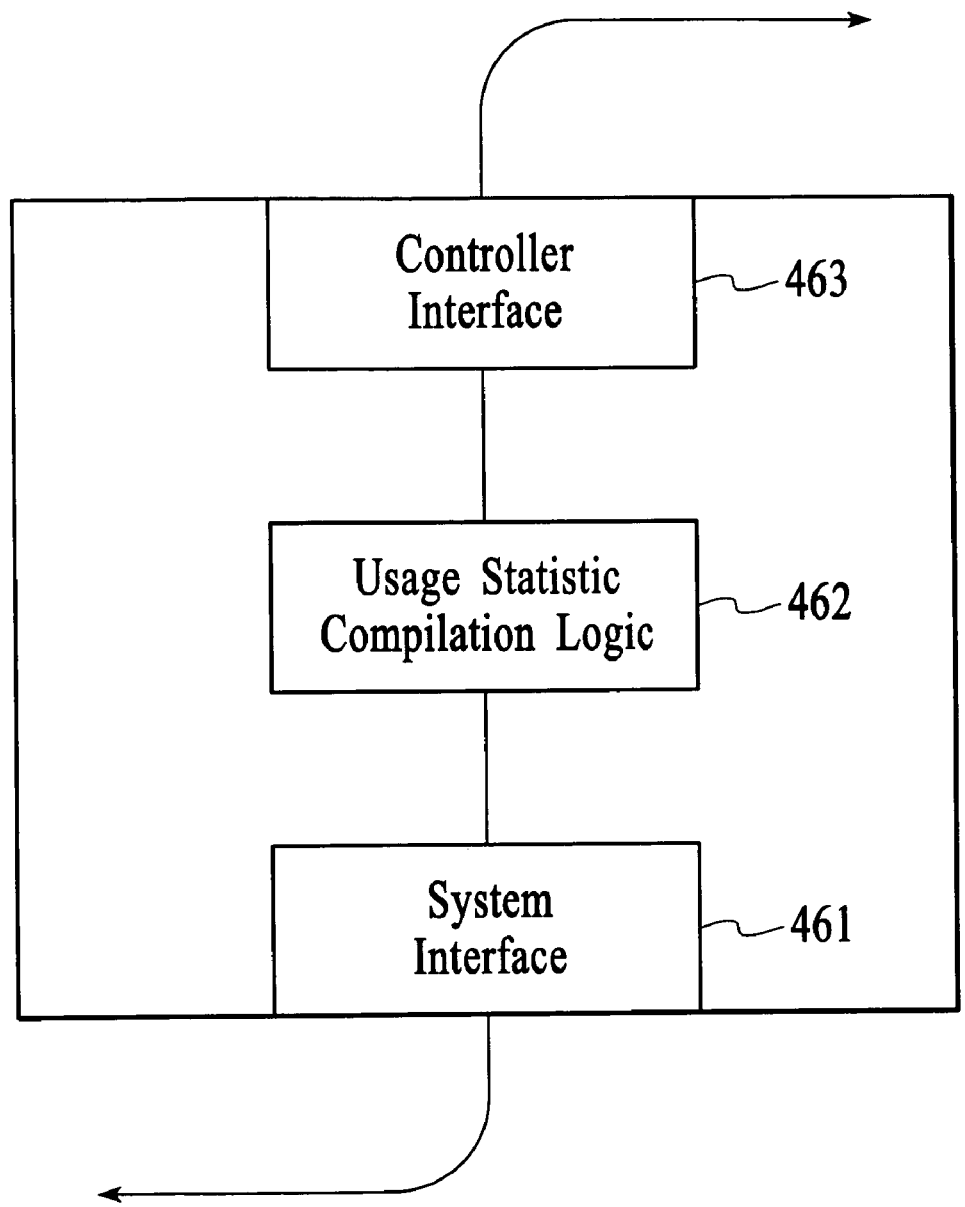
FIG. 7 shows a more detailed illustration of the subassembly management module in accordance with an embodiment of the present invention.

FIG. 7 shows a more detailed illustration of the subassembly management module 460. The subassembly management module 460 includes system interface logic 461, usage statistic compilation logic 462 and SMB controller interface logic 463. The system interface logic 461 is coupled to the usage statistic compilation logic 462 wherein the usage statistic compilation logic 462 is further is coupled to the SMB controller interface logic 463.

Although the components of the above-described subassembly management module 460 are shown in a specific configuration, one of ordinary skill in the art will readily recognize the components of the subassembly management module 460 could be configured in a variety of ways while remaining within the spirit and scope of the present invention.

The system interface logic 461 and the SMB controller interface logic 464 include the languages, codes and messages employed by the subassembly management module 460 to respectively communicate with the central computer system and the SMB controller. The usage statistic compilation logic 463 includes logic for maintaining statistics related to the operation of the one or more subassemblies. These statistics are retrieved from the counters contained within each of the monitored subassemblies. This statistics could include time on and cycle count data or any type data that is related to the operation of the associated subassembly. Accordingly, the subassembly management module 460 can utilize the information related to subassembly usage to activate/deactivate the monitored subassemblies and/or for the determination of pre-failure warranty and pre-failure warning features for the associated subassembly.

Figure 8:
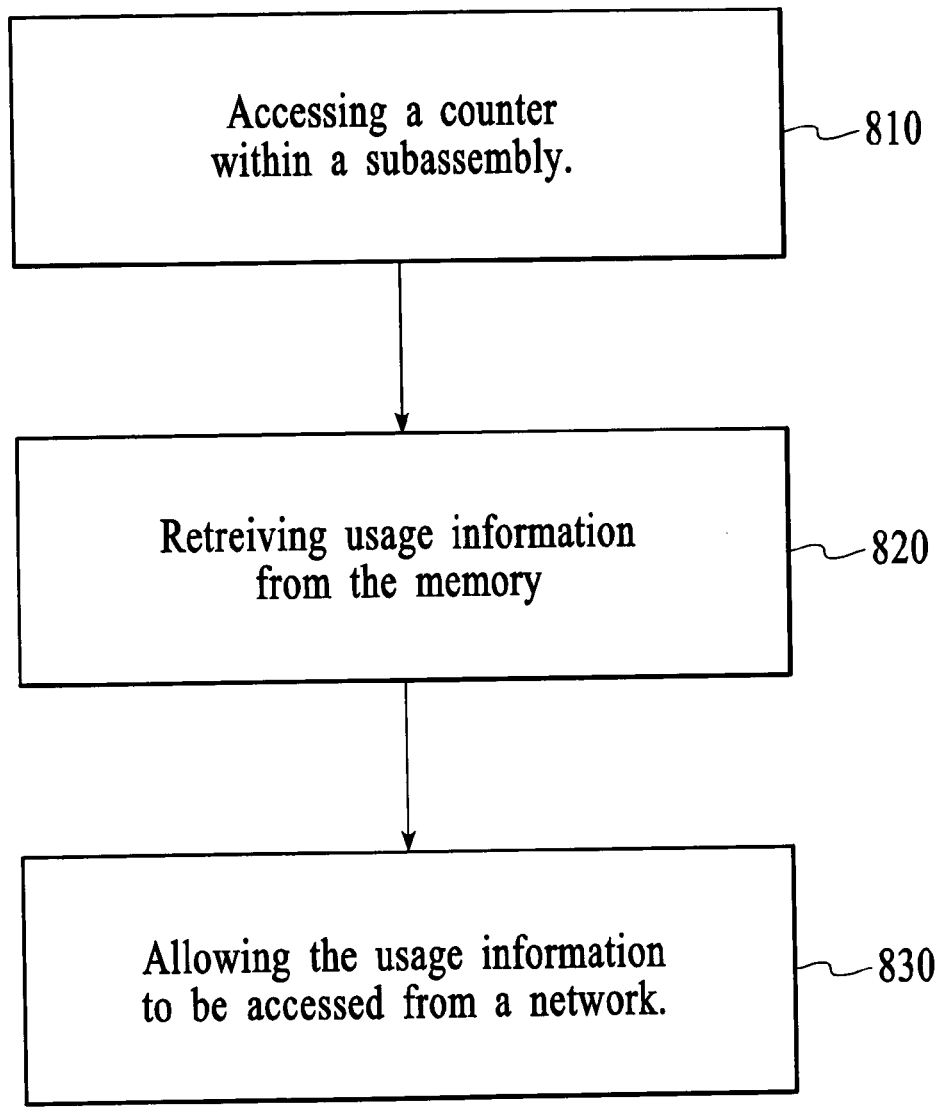
FIG. 8 is a flowchart of program instructions that could be contained within a system management module in accordance with an embodiment of the present invention.

FIG. 8 is a flowchart of program instructions that could be contained within a system management module. A first step 810 involves accessing a counter within a subassembly. In an embodiment, the subassembly is within a computer system or the like and the counter is coupled to a memory. A second step 820 includes retrieving usage information from the memory. A final step 830 includes allowing the usage information to be accessed from a network. In an embodiment, the network is the Internet.

As shown in the drawings for purposes of illustration, a device for monitoring a system is shown. In accordance with varying embodiments, a hardware device is implemented to track and store the run time and number of power on cycles (or other duration and event count items) for a hardware subassembly. This information remains stored within the subassembly during the deployed life of the subassembly. Information can be retrieved from the subassembly through an optional connection to a system management bus. Alternatively, a diagnostic tool can be used to access the hardware device and retrieve the run time/number of power cycles information. This information can be useful in measuring reliability parameters for the subassembly in field use. It may also be possible to use this information for the determination of pre-failure warranty and pre-failure warning features for the subassembly.

Without further analysis, the foregoing so fully reveals the gist of the present invention that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

What is claimed:

1. A method of retrieving reliability data of a system comprising:
    coupling a data collection device to the system, the data collection device comprising a nonvolatile memory module and a jumper;
    collecting the reliability data with the data collection device;
    storing the reliability data in the nonvolatile memory module;
    coupling a diagnostic tool to the data collection device; and
    retrieving the reliability data from the data collection device;
    wherein collecting the reliability data further comprises counting at least one event related to the system with the device; and
    wherein the data collection device comprises a capacitor coupled to a counter and a power supply, and wherein the capacitor stores adequate power to complete write operations in the event the power supply is turned off.

2. The method of claim 1 wherein retrieving the reliability data with the device further comprises:
    retrieving a total number of hours of operation for a subassembly in the system; and
    retrieving a number of times the subassembly has been activated.

3. The method of claim 2 wherein the data collection device includes a jumper and coupling a diagnostic tool to the device further comprises:
    coupling the diagnostic tool to the jumper; and powering the data collection device from the diagnostic tool.

4. The method of claim 1 wherein retrieving the reliability data further comprises:
    retrieving the reliability data via a network.

5. The method of claim 1 further comprising managing at least one redundant subassembly in the system using the reliability data.

6. A device for monitoring a system comprising:
    a counter for counting at least one event related to the system; and
    a memory coupled to the counter for storing data therefrom wherein the memory is capable of being accessed by another system in order to retrieve the stored data; and
    a jumper that provides an input/output connection to the memory and a power input to power the device;
    a capacitor coupled to a counter and a power supply, wherein the capacitor stores adequate power to complete write operations in the system in the event the power supply is turned off.

7. The device of claim 6 wherein the memory comprises a non-volatile EEPROM.

8. The device of claim 6 wherein the device further comprises a controller coupled to the memory.

9. The device of claim 6 wherein the device comprises a capacitor coupled to the counter and a power supply, and wherein the capacitor stores adequate power to complete write operations in the event the power supply is turned off.

10. The device of claim 6 wherein the device is capable of being coupled to a power supply within the system.

11. A data collection network comprising:
    a plurality of subsystems;
    a controller coupled to each of the plurality of subsystems;
    a device displaced within each of the plurality of subsystems, wherein the device is coupled to the controller and includes a counter for counting at least one event related to the system;

a memory coupled to the counter for storing data therefrom a jumper that provides an input/output connection to the memory and a power input to power the device; and wherein the memory is capable of being accessed by another system in order to retrieve the stored data;

wherein the device comprises a capacitor coupled to the counter and a power supply, and wherein the capacitor stores adequate power to complete write operations in the event the power supply is turned off.

12. The network of claim 11 wherein the device of each of the plurality of subsystems is coupled to the controller via a multiplexing mechanism.

13. The network of claim 11 wherein the plurality of subsystems comprises at least one of the following:
   hot-pluggable hard drive assemblies;
   hot-pluggable power supplies;
   system boards;
   blade modules;
   chassis;
   hot-pluggable fan assemblies;
   backplanes; expansion boards;
   processor modules;
   memory;
   toner cartridge; and
   projector lamps.

14. The network of claim 11 wherein the network further comprises a central system coupled to the plurality of subsystems via the controller.

15. The network of claim 14 wherein the controller is capable of being accessed by a remote system via the Internet.

16. An event monitoring mechanism comprising:

a counter for counting at least one event related to the system wherein the counter includes a non-volatile EEPROM memory for storing data;

a capacitor coupled to the counter for supplying power to the device, wherein the is capacitor coupled to the counter and a power supply, and wherein the capacitor stores adequate power to complete write operations in a device in the event the power supply is turned off;

a diode coupled to the capacitor for preventing the capacitor from supplying a voltage to components on the system; and a System Management Bus controller coupled to the counter wherein the controller is capable of being accessed by another system in order to retrieve the stored data.

17. The mechanism of claim 16 wherein the at least one event comprises a total time that the system is active.

18. The mechanism of claim 16 wherein the at least one event comprises a total number of times that the system is activated.

19. The mechanism of claim 16 wherein the device is capable of being coupled to a power supply within the system.

20. The mechanism of claim 19 wherein the counter counts the number of times that the power supply is activated.

21. The mechanism of claim 16 wherein the System Management Bus controller can be accessed by the system.

22. The mechanism of claim 21 wherein the System Management Bus controller is capable of being accessed by a remote system via the Internet.

* * * * *